INVENTOR.
KENNETH E. EAKINS
BY Zulwider, Patton, Rieber
Lee, and Utecht
ATTORNEY United States Patent Office 3,749,776
Patented July 31, 1973

3,749,776
METHOD FOR BLOCKING PROSTAGLANDIN ACTIVITY
Kenneth E. Eakins, Sparkill, N.Y., assignor to Allergan Pharmaceuticals, Inc., Santa Ana, Calif.
Filed Aug. 28, 1970, Ser. No. 67,919
Int. Cl. A61k 27/00
U.S. Cl. 424—203    8 Claims

ABSTRACT OF THE DISCLOSURE

The disclosure describes a method of selectively blocking the actions of prostaglandins comprising administering of an effective amount of a polyheterocyclic phosphoric ester such as polyphloretin phosphate to the site of prostaglandin activity.

---

The invention described herein was made in the course of work under a grant or award from the Department of Health, Education and Welfare.

BACKGROUND OF THE INVENTION

The present invention relates to a method for selectively blocking the actions of prostaglandins. More particularly, the present invention relates to the prostaglandin blocking activity of certain polymeric phosphoric esters.

Prostaglandins are a group of unsaturated hydroxy and hydroxyketo long-chain carboxylic acids. These are widely distributed in human and animal tissues and possess a wide variety of pharmacological actions. It seems probable that prostaglandins have a biochemical role fundamental to many, perhaps all, animal cells. Many articles have been devoted to the prostaglandins especially the biochemical/pharmacological aspects. A recent review entitled, "Hypothesis on Physiological Roles of Prostaglandins" by E. W. Horton, Physiological Review, volume 49, No. 1, January 1969, reviews the present status of the knowledge on the functional significance of the prostaglandins.

Naturally occurring prostaglandins are 20-carbon fatty acids containing a cyclopentane ring. The parent saturated acid has been named prostanoic acid as drawn below:

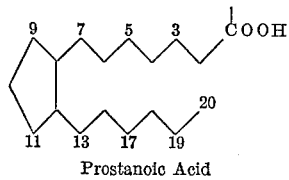

Prostanoic Acid

Four series of natural prostaglandins have so far been described, designated by the letters B, E, F and A corresponding to differences in the ring, as shown below:

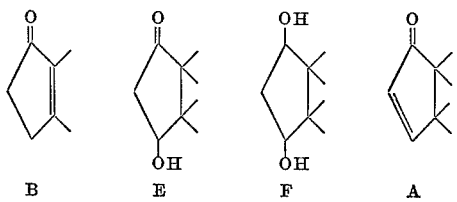

B  E  F  A

All of the prostaglandins have a 15-hydroxyl substituent. The degree of unsaturation of the side chains is indicated by the subscript numeral after the letter: thus prostaglandin $E_1$ has a trans double bond in the 13 position, $E_2$ has, in addition, a cis double bond in the 5 position, $E_3$ has a third double bond in the 17 position, etc.

The structural formulas of 14 naturally occurring prostaglandins are shown in figure 3 of the Horton reference, supra.

Prostaglandins have a wide variety of pharmacological actions, being active in such diverse areas as fertility, transport of sperm, menstruation, parturation, placental blood flow, gastric secretion, muscle contractility (including vascular smooth muscle, respiratory smooth muscle, gastrointestinal smooth muscle, uteral smooth muscle, and spleenic capsular smooth muscle), development of epidermal tissues and central nervous transmitters. Prostaglandins are also thought to affect permeability, e.g., the skin and the eye. Thus, it has been suggested that prostaglandins may act as mediators of various forms of inflammation. This role in inflammation is strongly supported by the involment of prostaglandins in the inflammatory process in joints, skin, and eyes.

For example, in the area of reproduction, control of prostaglandins could lead to direct inhibition or promotion of fertility in either male or female, since prostaglandins are normally found in high concentrations in semen and are known to significantly affect smooth muscle of the female reproductive tract. Furthermore, the association of subnormal prostaglandin levels with infertility in man lends support to the hypothesis that prostaglandins have a role in conception. Thus, specific control of these prostaglandins could lead to a means of changing or regulating male or female fertility or infertility.

Regarding parturation, it is known that amnionic fluid during labor contains a substantially higher amount of prostaglandins than amniotic fluid before the onset of labor. Thus it is reasonable to conclude that prostaglandins contribute to uterine contractions at parturation. Specific control of these prostaglandins could lead to anti-abortive or therapeutic abortive means and be of great value in obstetrics.

Prostaglandins have been identified in the central nervous system and they are known to be released from the brain and spinal cord on nerve stimulation and are normal constituents of cerebrospinal fluid. Horton, supra, indicates (at page 136) that the discovery of a specific prostaglandin antagonist would be of enormous help in settling the questions which have been raised about the role of prostaglandins in the central nervous system.

Certain prostaglandins have been found to be potent vasodilators in most vascular beds and must be considered as possible local mediators of blood flow in view of their widespread distribution in tissues. Furthermore, the identification of a vasodilator prostaglandins in the renal medula infers a role for prostaglandins in the control of renal blood flow and as etiological factors in renal hypertension.

Prostaglandins have been found in the lungs and have been postulated as related in some way to bronchial asthma. Prostaglandins are present in the stomach and intestine and are released spontaneously from various parts of the gastrointestinal tract. There is evidence that circulating prostaglandins can cause diarrhea.

In view of the foregoing areas in which prostaglandins may be of importance, it is clear that specific control of prostaglandin activity could lead to control over body functions hitherto unattainable.

The patent to Diczfalusy et al., U.S. Pat. No. 2,962,515 and a patent to Ferno et al., U.S. Pat. No 2,962,495, describe polymeric phosphoric ester antienzymic substances obtained by phosphorylating flavones flavanones, chalcones, and dihydrochalcones containing at least one phenolic hydroxyl group, as exemplified by substances such as polyphloretin phosphate, polymethylphloretin phosphate, poly-quercetin phosphate, poly-naringenin phosphate and polyhesperetin phosphate The Diczfalusy et al. and Ferno et al. patents indicate that the substances have increased anti-enzymatic effect on alkaline phosphatase and hyaluronidase.

It has now been discovered that some of these polyheterocyclic phosphoric esters, such as polyphloretin phosphate act to selectively block the actions of prostaglandins. This prostaglandin-blocking activity is unreleated to the ability of these polymer phosphoric substances to inhibit various enzymes. It should be recognized that the discovery of a composition having the ability to selectively block the actions of prostaglandins is a basic discovery that potentially may have far reaching effects, especially in view of the apparently universal role of prostaglandins in the human body.

SUMMARY OF THE INVENTION

The present invention relates to a method of selectively blocking the actions of prostaglandins which comprises administering an effective amount of a polyheterocyclic phosphoric ester selected from the group consisting of polyphloretin phosphate and polystilbol phosphate to the site of prostaglandin activity.

DESCRIPTION OF THE INVENTION

Figure 1:
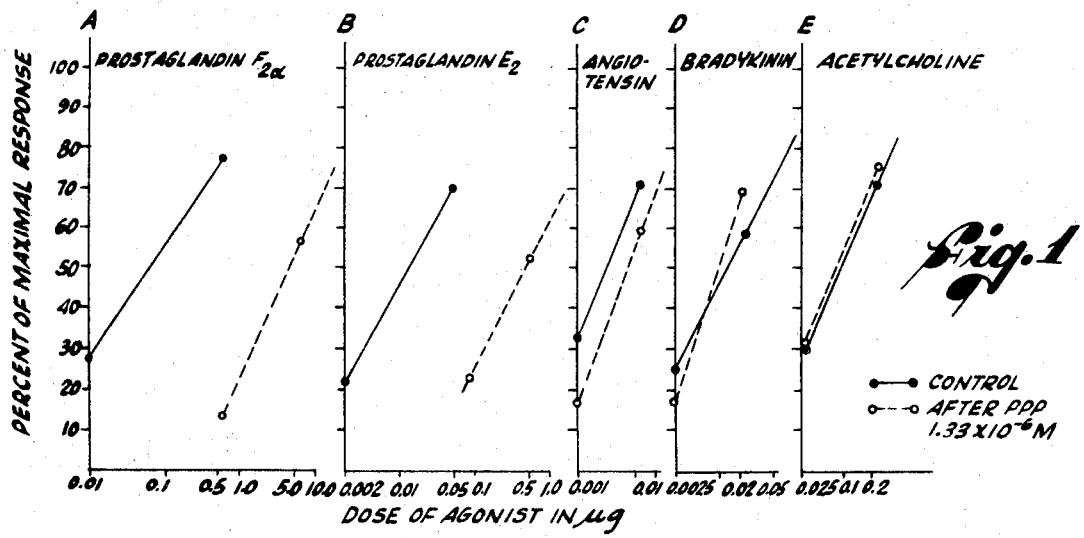
FIGS. 1–3 show graphs relating to the experimental findings as described in the examples below.

The mannner of making the polyheterocyclic phosphates does not form a part of the present invention, nor do the polyheterocyclic phosphates themselves. A complete description of these polymers and methods of making them is found in Diczfalusy et al., and Ferno et al., supra. Those portions of Diczfalusy et al., and Ferno et al., which relate to the polyheterocyclic phosphates and their method of making is hereby incorporated by reference.

Phloretin is a dihydrochalcone having the following formula:

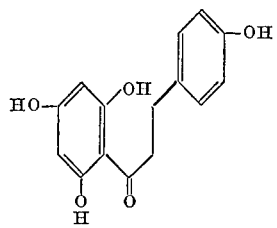

It is hypothesized that polyphloretin phosphate is an especially potent specific blocking agents of prostaglandins due to its configuration, that is, lack of hindrance of the phenol group and attached carbon chain, which permits the formation of a helix configuration which apparently enables the polyphloretin phosphate to selectively block the prostaglandins.

The amount of polyheterocyclic phosphate which is an effective amount varies with the type of prostaglandin activity that is blocked, the manner of administration of the blocking agent, i.e., topically or systemically and whether the blocking is in vivo or in vitro. For example, with respect to polyphloretin phosphate, it has been found that about 5–200 μg./ml. bathing fluid of organ bath blocks the effect of prostaglandins on in vitro smooth muscle tissue. It has also been found that about 0.1 ml. of a 1–10% solution of polyphloretin phosphate administered topically to the eye antagonizes the effect of prostaglandins on interoccular pressure in in vivo experiments with rabbits. The in vivo effects of prostaglandins on blood pressure and feces (formation of diarrhea) in mice can be blocked by intraperitoneal injections of polyphloretin phosphate in amounts of 25–200 mg./kg. body weight.

The following examples investigate the mechanism of action of polyheterocyclic phosphates and related compounds as prostaglandin antagonists. It is understood that the examples are for the purpose of illustration and the invention is not to be regarded as limited to any of the specific compounds or conditions recited therein.

In Examples I, II, and III, the following testing method was used:

Jirds (Meriones Shawwi) weighing between 50–150 grams were killed by a blow on the head. The middle part of the ascending colon was removed, and set up in a 5 ml. organ bath containing de Jalon's rat colon solution at 28° C., gassed with oxygen. A dose-cycle of 3–4 minutes and a contact time of 1–2 minutes was used for the agonists studied. Contractions were measured isotonically with a Brush isotonic muscle transducer used in conjunction with a Brush 220 recorder.

Before any drugs were added, the tissue was left in the organ bath for thirty minutes with repeated changes of the bathing fluid. During this period and that following the introduction of the first few doses of agonist, the resting tension was adjusted to achieve a rapid return to baseline with the minimum lever load. Sensitivity was adjusted to achieve a rapid return to baseline with the minimum lever load. Sensitivity was adjusted electronically so that the maximum contraction yielded slightly less than a full scale deflection of the pen.

EXAMPLE 1

Suitable doses of the following spasmogens (agonists) listed below were chosen to yield submaximal contractions between 25 and 75 percent of maximum. When constant responses were established for these agonists, each of the potential antagonists listed below was added to the bathing fluid and left in contact with the tissue for 2 minutes prior to the addition of each agonist. A concentration of antagonists in the bathing fluid was then increased step-wise, to a maximum 200 μg./μl. and any alterations in the responses produced by the agonists was noted. Each potential antagonist was studied on a fresh piece of tissue.

| Agonists | Antagonists |
| --- | --- |
| Prostaglandin E₂ and F₂ₐ | Phloridzin dihydrate. |
| Acetylcholine chloride | Phloretin. |
| Angiotensin amide | Polyphloretin phosphate (PPP). |
| Bradykinin triacetate | Sodium heparin. |
| | Polystilbol phosphate (PSP). |
| | Polyestradiol phosphate (PEP). |
| | Polyhydroquinone phosphate (PHQP). |
| | Polyphloroguicinol phosphate (PPGP). |

Phloridzin, phloretin, PHQP and PEP were obtained as powders and dissolved with $Na_2CO_3$ to adjust the pH between 7.0 and 7.5; PPP, PSP and PPGP were used as a 10% w./v. solutions for injection. (All doses referred to the salts.)

PPP was found to be the most effective selective prostaglandin antagonist in this group of compounds. PPP markedly antagonized submaximal contractions produced by PGE₂ (prostaglandin E₂) and PGF₂ₐ at concentrations as low as 10 μg./ml. without altering contractions produced by the other agonists. FIG. 1 graphs the effect of PPP against the agonists tested.

Of the compounds related to PPP, phloridizin, at concentrations as high as 200–400 μg./ml., was found to produce a nonselective antagonism of all the agonists. Phloretin was a more potent antagonist than phloridizin, antagonizing responses produced by PGF₂ₐ and PGE₂ in concentrations less than 10 μg./ml., but these doses of phloretin were not selective since contractions produced by other agonists were also depressed. Of the phosphorylated polymers studied, PSP exhibited some prostaglandin blocking activity at concentrations of 20 μg./ml.; responses to PGE₂ were markedly depressed while contractions produced by acetylcholine and angiotensin were only slightly reduced. In contrast, PHQP and PPGP, in concentrations as high as 400 μg./ml. in the bathing fluid, failed to antagonize submaximal contractions produced by any of the agonists used in these experiments. PEP showed only slight blocking activity to all agonists at concentrations as high as 100–200 µg./ml.

The hyaluronidase antagonist, heparin, in concentrations as 100–200 µg./ml., was without effect on the contractions produced by any of the agonists used in this study. Based on these initial results, PPP, PSP, phloridzin and phloretin were chosen to be studied in greater detail.

EXAMPLE II

PPP, PSP, phloretin and phloridizin, the compounds which showed blocking of prostaglandin activity in Example I at concentrations less than 200 µg./ml. in the marked reductions in the maximal contractions produced by all the agonists tested were observed.

EXAMPLE III

The present example differs from Examples I and II in that only one agonist was studied on each tissue and the antagonist was added to the bathing fluid reservoir and allowed to remain in contact with the tissue for 45 to 60 minutes (the time required to achieve a stable level of inhibition of the agonist). The effects of several progressive increases in the concentrations of antagonists were determined on each preparation. The antagonists used in the present example were PPP and PSP.

TABLE 1.—ANTAGONISM OF VARIOUS AGONISTS ON THE ISOLATED JIRD COLON BY POLYPHLORETIN PHOSPHATE (PPP), PHLORIDZIN, PHLORETIN AND POLYSTILBOL PHOSPHATE (PSP)

| Antagonist concentration | Dose ratios [1] | | | | |
|---|---|---|---|---|---|
| | $PGE_2$ | $PGF_{2\alpha}$ | Acetylcholine | Angiotensin | Bradykinin |
| PPP [2]: | | | | | |
| 0 | 1 | 1 | 1 | 1 | 1 |
| [X][3] | [11±5.01] | [49±18] | [79±38] | [1.7±0.6] | [6.4±2.5] |
| $3.3 \times 10^{-7}$ M | 3.3±0.7 | 3.4±0.4 | 1.05±0.2 | 1.4±0.3 | 1.4±0.4 |
| $6.6 \times 10^{-7}$ M | 8.4±2 | 13.4±3.5 | 1.07±0.3 | 1.7±0.5 | 1.9±0.6 |
| $1.3 \times 10^{-6}$ M | 34±8 | 56±10 | 1.2±0.3 | 2.7±1.2 | 2.5±0.9 |
| $2.7 \times 10^{-6}$ M | 128±6 | 181±38 | 1.4±0.3 | 4.7±1.8 | 2.5±0.9 |
| Phloretin: | | | | | |
| 0 | 1 | 1 | 1 | 1 | 1 |
| [X] | [20±11] | [46±6.0] | [57±8.0] | [2.1±0.4] | [6.9±5.0] |
| $1.5 \times 10^{-6}$ M | 1.3±0.3 | 1.4±0.1 | 0.91±0.1 | 1.7±0.4 | 1.2±0.2 |
| $3.0 \times 10^{-6}$ M | 1.6±0.1 | 2.0±0.1 | 0.9±0.1 | 1.6±0.2 | 2.3±0.4 |
| $6 \times 10^{-6}$ M | 2.5±0.2 | 5.1±2 | 1.5±0.5 | 5.1±2 | 4.5±0.5 |
| Phloridzin: | | | | | |
| 0 | 1 | 1 | 1 | 1 | 1 |
| [X] | [3.6±0.7] | [23±6.0] | [64±37] | [2.0±1.1] | [6.9±5.0[ |
| $6.7 \times 10^{-5}$ M | 1.6±0.3 | 1.5±0.3 | 1±0.1 | 1.7±0.6 | 2.4±1 |
| $1.7 \times 10^{-4}$ M | 3.5±1.6 | 2.0±0.4 | 1.4±0.5 | 2.0±0.3 | 3.0±2 |
| $3.4 \times 10^{-4}$ M | 3.5±1.7 | 2.7±0.8 | 1.0±0.5 | 2.8±0.5 | |
| PSP: | | | | | |
| 0 | 1 | 1 | 1 | 1 | 1 |
| [X] | [3.2±0.7] | [22±5] | [29±10] | [1.1±0.3] | |
| $1 \times 10^{-6}$ M | 1.3±0.2 | 1.1±0.02 | 1.1±0.2 | 1.3±0.3 | |
| $2 \times 10^{-6}$ M | 2.0±0.2 | 1.5±0.2 | 1.05±0.1 | 3.8±2 | |
| $4 \times 10^{-6}$ M | 18±5 | 4±0.6 | 2.6±0.8 | 11±7 | |

[1] Dose-ratio for each agonist calculated at the level of the $ED_{50}$; each point is the mean of at least 4 observations ± S.E.M.
[2] Molar concentrations of PPP are calculated assuming a molecular weight of 15,000.
[3] [X] is the $ED_{50}$ in µg. for a 5 ml. organ bath.

bathing fluid, were studied in more detail. Two doses of each of the agonists described in Example I yielding responses between 30 and 80% of maximum were chosen and repeated until stable responses were established. A dose of antagonist was then added to the bath prior to each dose of every agonists as described in Example I. The entire series of agonists was given at one antagonists dose-level before progressing to the next higher concentration of agonists. If inhibition occurred, appropriately increased doses of agonists were given to maintain responses between 30 and 80% of maximum.

All responses were then expressed as percent of the maximal shortening, and log dose-response curves constructed. All horizontal shifts of dose-response curves were measured at the level of the $ED_{50}$.

The results obtained are shown in Table 1. Dose ratios are shown for each agonist in the presence of varying concentrations of different antagonists. It is quite clear from Table 1 that PPP is the most potent and specific prostaglandin antagonist of all the compounds studied. Whereas, dose-ratios of 128 and 181 were obtained for prostaglandins $E_2$ and $F_{2\alpha}$ respectively, in the presence of 2.7 times $10^{-6}$ M PPP (40 µg./ml.), angiotensin, the next most susceptible compound, had a dose ratio of only 4.7 and that for acetylcholine was essentially unaltered.

Figure 2:
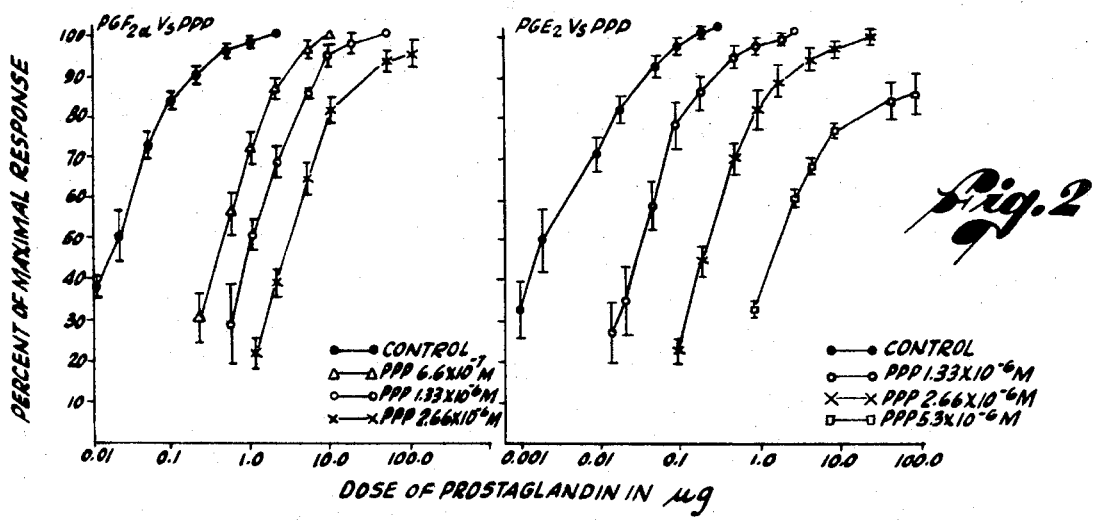
Figure 3:
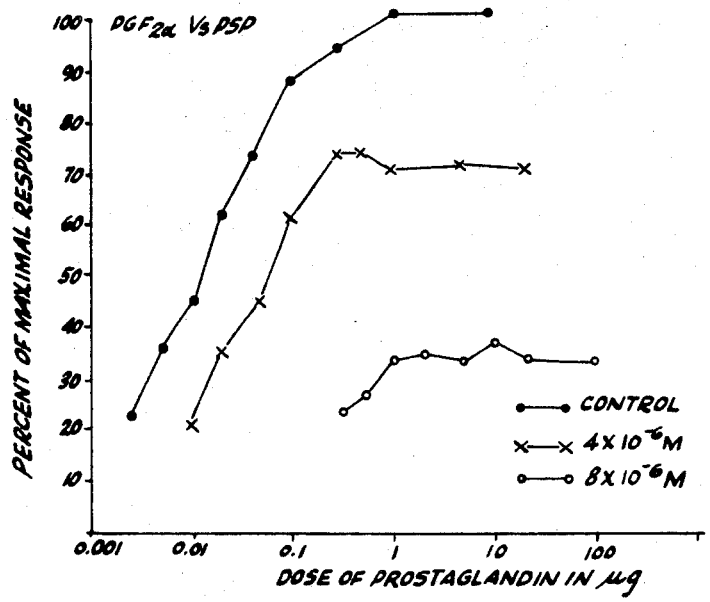

By comparison with PPP, phloretin ($1.5 \times 10^{-6}$ M to $6 \times 10^{-6}$ M) was barely active as an antagonist and lacked specificity of the prostagladins. Phloridizin ($8.7 \times 10^5$ to $3.4 \times 10^{-4}$ M) was even less potent than phloretin. PSP ($10.4 \times 10^{-6}$ M) while somewhat less potent and specific than PPP, nonetheless antagonized both $PGE_2$ and $PGF_{2\alpha}$. It should also be noted that these concentrations of PSP produced a moderate blockade of the responses to angiotensin. Higher doses of PSP could not be studied since The effects of PPP in concentrations of $3.3 \times 10^{-7}$ M to $5.4 \times 10^{-6}$ M (5 to 80 µg./ml.) on the log dose-response curves to prostaglandins $E_2$ and $F_{2\alpha}$ are seen in FIG. 2. These concentrations of PPP resulted in a considerable shift to the right in parallel of the dose-response curves to both prostaglandins. This shift in the dose-response curves was obtained over a wide range without depression of the maximal response to either prostaglandin, but with the higher concentrations of PPP some depression of maxima was observed. In contrast, PSP in concentrations of $2 \times 10^{-6}$ M to $8 \times 10^{-6}$ M was found to produce a concentration-dependent depression of the maximal contracting effect of prostaglandins $E_2$ and $F_{2\alpha}$ associated with some shift of the dose-response curve to the right. Results obtained with prostaglandin $F_{2\alpha}$ and PSP are shown in FIG. 3.

In contrast to the reversible nature of the antagonism of the prostaglandins produced by PPP, no recovery from PSP blockade was observed over a 3 hour period.

Heparin, known to antagonize hyaluronidase, was not found to antagonize contractions of the Jird colon elicited by eight $PGF_{2\alpha}$ or $PGE_2$. In addition, other polymeric phosphates with enzyme inhibitory properties similar to those of PPP, namely, PHQP, PPGP and PEP, were not found to possess any significant prostaglandin-blocking activity. Thus, the present examples show that the ability of PPP to antagonize responses of the Jird colon to prostaglandins is not related to its inhibitory actions on various enzymes including alkaline phosphatase and hyaluronidase.

The results obtained in Examples I, II and III show that, of the compounds studied, only PPP is a specific, reversible, surmountable antagonist of the smooth muscle stimulating actions of prostaglandins $E_2$ and $F_{2\alpha}$. PSP which also antagonizes $PGE_2$ and $PGF_{2\alpha}$ is less potent and is only slowly reversible. PSP was less specific, since it antagonized angiotensin and to a lesser degree acetylcholine. Phloretin and phloridzin were less potent and even less specific for the prostaglandins. None of the other polymers studied showed by prostaglandin blocking activity. Thus the potency of PPP as a prostaglandin antagonist, as compared to phloretin (the parent flavanone) and phloridzin (the corresponding glucoside), which have very little activity, indicate that the prostaglandin-blocking activity is not a property of the flavanone moiety itself.

EXAMPLE IV

The prostaglandin blocking activity of polyphloretin phosphate was tested on the isolated rabbit jejunum and uterus. All contractions were measured isotonically with a Brush isotonic muscle transducer and a Brush 220 recorder. A 5 ml. organ bath was used for all the isolated preparations. Doses of agonist yielding suitable submaximal responses from the tissues were chosen before exposure of the tissue to PPP.

Rabbit jejunum (A) New Zealand white rabbits (1–3 kg.) were killed by a blow on the head. The jejunum was removed and a suitable segment was suspended in Tyrode solution at 37° C. and gassed with oxygen. A dose cycle of 3–4 minutes in a contact time of 60–90 seconds was used for the agonists listed below. PPP was added to the bath and left in contact for 5 minutes before the addition of each agonist.

Agonists 5-hydroxytryptamine
prostaglandin $E_2$
acetylcholine
prostaglandin $F_{2\alpha}$ Rabbit uterus (B) A suitable portion of a uterine horn from a freshly killed New Zealand white rabbit was suspended in Tyrode solution at 37° C. gased with oxygen. A dose cycle of 10 to 15 minutes was used for the agonists listed in part (A). PPP was added to the bath and left in contact for 5 minutes before the addition of each agonist.

PPP (2.5–30 µg./ml.) was found to antagonize selectively the contractions produced by $PGE_2$ and $PGF_{2\alpha}$ on the isolated rabbit jejunum and uterus. The antagonism was reversible and could be overcome by increasing the dose of prostaglandin. PPP antagonized $PGE_2$ as readily as $PGF_{2\alpha}$.

EXAMPLE V

The effect of polyphloretin phosphate on interoccular pressure changes induced in vivo by injections of prostaglandins $E_1$, $E_2$, $F_{1\alpha}$, $F_{2\alpha}$ and $A_1$ in rabbits' eyes was determined as follows:

New Zealand white rabbits weighing 2.5–3.5 kg. were anaesthetized with 1–2 g./kg. urethane injected into a marginal ear vein as a 25% solution in 0.9% NaCl solution. The femoral artery and vein were cannulated and mean arterial blood pressure was measured and recorded. Each animal received heparin 250–500 i.u./kg. intravenously before cannulation of the eyes.

Two hypodermic needles were then introduced through the cornea into the anterior chamber of each eye. One needle (23 gauge) was connected by polyethylene tubing to a pressure transducer and the interoccular pressure (IOP) measured. The other needle (27 gauge) was connected by polyethylene tubing to a calibrated micrometer syringe for the intracameral injections. All intracameral injections were made after at least 5 min. recordings of steady state IOP.

Solutions of prostaglandins (10 mg./ml.) in 95% ethyl alcohol were diluted to the desired concentration in 0.9% NaCl immediately before use. A constant dose-volume of 10 µl. was used for the intracameral injections. Each injection of prostaglandin into the test eye was accompanied by a simultaneous injection of an equal volume of saline into the contralateral control eye.

The method used was as follows: Simultaneous intracameral injections of 1 µg. of each prostaglandin were made into both eyes of each rabbit. Polyphloretin phosphate (10 mg./ml.) was infused into the peripheral stump of the lingual artery on one side at a rate of 0.5 mg./minute. The infusion started 15 minutes before each prostaglandin injection and continued throughout the response period.

(a) Control

No change in IOP was observed following the intracameral injection of 10 µl. 1% ethanol. This was equivalent to the highest concentration of alcohol in any prostaglandin test solution.

(b) Effect of prostaglandins on IOP

In a typical response the left eye received 0.5 µg. $PGE_1$ at time 0, while the right eye was used as a control and received an equal volume of 0.9% NaCl solution. Following the injection artefact, the IOP of the control eye returned to normal within 5–10 minutes. The test eye, on the other hand, showed a rise in IOP after the injection artefact, associated with increased amplitude of pulsation. In general, the IOP in the test eyes reached a maximum by 10–15 minutes remained at this level for a variable length of time, then slowly returned to the initial value within 40–120 minutes, depending on the particular prostaglandin used and the dose injected.

(c) Effect of polyphloretin phosphate on the response of the IOP to prostaglandin $E_2$ Close-arterial infusion of polyphloretin phosphate was found to inhibit or markedly antagonize the rise in IOP normally seen after the intracameral injection of 1µg. $PGE_2$. Results are shown in table 2 below. Thus, for example, while the IOP in the left eye increased by 162% after $PGE_2$, an IOP response was not evident in the right eye, which received the close-arterial infusion of polyphloretin phosphate.

Results for prostaglandins $E_1$, $F_{1\alpha}$, $F_{2\alpha}$ and $A_1$ were comparable.

TABLE 2.—EFFECT OF CLOSE-ARTERIAL INFUSIONS OF POLYPHLORETIN PHOSPHATE (PPP) ON THE RISE IN IOP PRODUCED BY INTRACAMERAL INJECTIONS OF PROSTAGLANDIN $E_2$ IN THE RABBIT

| | Left eye, (1 µg. prostaglandin $E_2$), percent increase IOP | Right eye, (1 µg. prostaglandin $E_2$+PPP), percent increase IOP |
|---|---|---|
| | 286 | 36 |
| | 124 | 41 |
| | 162 | 14 |
| | 64 | 2 |
| | 196 | 35 |
| Mean | 166 | 26 |
| ±S.E. | 37 | 8 |

EXAMPLE IV

Example V was repeated, except that the polyphloretin phosphate was administered topically rather than systemically (by injection). The test eye was treated at (minus) one hour with 2 drops (0.1 ml.) 10% PPP by topical application to the cornea. At (minus) 10 minutes 2 more drops of 10% PPP were topically administered. At zero time, both eyes received 0.5 µg. $PGF_{2\alpha}$ by intracameral injection. The intraocular pressure was then recorded for 20 minutes.

The test eye pretreated with PPP showed a smaller rise in IOP following the introduction of $PGF_{2\alpha}$ than the contralateral control eye. Thus, topical application of PPP antagonizes the rise in IOP produced by $PGF_{2\alpha}$. Table 3 tabulates the results.

TABLE 3.—ANTAGONISM BY TOPICAL APPLICATION OF PPP OF THE RISE IN INTRAOCCULAR PRESSURE (IOP) PRODUCED BY INTRACAMERAL INJECTIONS of PGF$_2$

| Prostaglandin dose | Percent increase in IOP | |
|---|---|---|
| | Test eye | Control eye |
| 0.5 µg | 14.6 | 95.4 |
| 0.5 µg | 11.5 | 61.0 |
| 0.5 µg | 36 | 77.5 |
| 0.5 µg | 27.8 | 95.0 |

EXAMPLE VII

Antagonism by polyphloretin phosphate of prostaglandin-induced diarrhea in mice.

Abino Swiss mice of both sexes weighing between 20–25 gm. were allowed free access to food and water. Diarrhea was induced in groups of 12 mice by the intraperitoneal or intravenous (tail vein) injection of prostaglandin E$_2$ (PGE$_2$). The appearance of semifluid feces within 30 minutes after the injection of prostaglandin was scored as a positive response. The smallest dose of PGE$_2$ required to produce ED$_{100}$ positive response was found to be 50 µg./kg. for the intraperitoneal injection and 250 µg./kg. for the intravenous injection. Varying doses of PPP were given in a dose-volume of 0.5 ml. 15 minutes before administration of the PGE$_2$. Tables 3–6 below tabulate the results:

Table 3

| | Percent induction of diarrhea |
|---|---|
| Saline | 91.7 |
| Dose of PPP, mg./kg.: | |
| 50 | 66.6 |
| 100 | 25.0 |
| 200 | 0.0 |

Intraperitoneal PPP followed in 15 minutes by 50 µg./kg. of PGE$_2$ intraperitoneally.

Table 4

| | Percent induction of diarrhea |
|---|---|
| Saline | 91.0 |
| Dose of PPP, mg.kg.: | |
| 25 | 84.3 |
| 50 | 75.0 |
| 100 | 25.0 |
| 200 | 0.0 |

Intraperitoneal PPP followed in 15 minutes by 250 µg./kg. of PGE$_2$ intravenously.

Table 5

| | Percent induction of diarrhea |
|---|---|
| Min.: | |
| 15 | 0.0 |
| 30 | 16.6 |
| 60 | 58.3 |
| 120 | 72.8 |

200 mg./kg. intraperitoneal PPP followed at varying times by 50 µg./kg. of PGE$_2$ intraperitoneally.

Table 6

| | Percent induction of diarrhea |
|---|---|
| Min.: | |
| 15 | 0.0 |
| 30 | 33.3 |
| 60 | 38.5 |
| 120 | 92.5 |

200 mg./kg. intraperitoneal PPP followed at varying times by 250 µg./kg. PGE$_2$ intravenously.

200 mg./kg. of PPP completely blocked the diarrhea which could otherwise result from the administration of PGE$_2$. The lower dosages of PPP were also effective proportional to the concentrations administered, with the ED$_{50}$ dosage between 50 and 100 mg./kg.

The mice reacted similarly to the PGE$_2$ administration regardless of the route of administration. The hair became erected and often they exhibited a "stretching" posture which was usually quickly followed by diarrhea. The diarrhea in the saline control groups nearly always occurred within 5 minutes following the PGE$_2$ administration.

The experimental results indicated that the PPP antagonism of PGE$_2$ disappears with time with little activity remaining at 2 hours following injection. These data demonstrate that PPP is an antagonist of PGE$_2$. Additionally, it shows that PPP is an active antagonist of PGE$_2$ in an intact animal.

EXAMPLE VIII

It is known that application of croton oil to a rat ear induces inflamation and swelling. The inflamation and edema are measured by determining the weight increase of the treated ear over the control ear, Tonelli et al., Endocrinology 77:625, 1965.

Samples of rat ear were weighed 6 hours after treatment. A neutral aqueous solution of PPP was used. The confidence level in all cases was 99.5% (probability that the test data was significant). Table 7 tabulates the results:

TABLE 7

| Treatment | Mg./kg. | Avg. percent increase in ear weight ±S.D. | Number of samples |
|---|---|---|---|
| Saline | | 126.6±34 | 15 |
| PPP | 100 | 80.2±36.2 | 15 |
| PPP | 200 | 70.6±50.4 | 14 |
| PPP | 500 | 45.6±30.1 | 15 |
| Dexamethazone [1] | 60 | 78.0±7.7 | 6 |

[1] Dexamethazone: Steroid known to antagonize the effect of croton oils

What is claimed is:

1. A method for selectively blocking a pharmacological action of a prostaglandin in human and animal tissue comprising administering to said human or animal tissue a prostaglandin in sufficient amount to produce a pharmacological action in the human or animal tissue and blocking the pharmacological action by administering to said human or animal tissue an effective amount of a polyheterocyclic phosphoric ester selected from the group consisting of polyphloretin phosphate and polystilbol phosphate.

2. The method of claim 1 wherein the prostaglandin is selected from the group consisting of prostaglandins E$_1$, E$_2$, F$_{1\alpha}$, F$_{2\alpha}$, and A$_1$.

3. The method of claim 1 wherein the polyheterocyclic phosphoric esters are in the form of their pharmaceutically acceptable salts.

4. The method of claim 1 wherein the polyheterocyclic ester is administered prior to the prostaglandin.

5. The method of claim 1 wherein the manner of administration of the prostaglandin is systemic.

6. The method of claim 5 wherein the manner of administration of the polyheterocyclic phosphoric ester is systemic.

7. The method of claim 1 wherein the manner of administration of the prostaglandin is topical.

8. The method of claim 7 wherein the manner of administration of the polyheterocyclic phosphoric ester is topical.

References Cited

Chem. Abst. Subject Index, vol. 56–65 (1962–66), p. 18815S.

Beitch & Eakins, Brit. J. of Pharmacology, vol. 37, No. 1 (1969), pp. 158–167.

SAM ROSEN, Primary Examiner

U.S. Cl. X.R.

424—318

UNITED STATES PATENT OFFICE
CERTIFICATE OF CORRECTION

Patent No. 3,749,776        Dated July 31, 1973

Inventor(s) Kenneth E. Eakins

It is certified that error appears in the above-identified patent and that said Letters Patent are hereby corrected as shown below:

Col. 2, line 16: "involment" should be --involvement--.
Col. 2, line 66: "flavones" should be --flavones,--. Col. 2, line 71: "phosphate" should be --phosphate.--. Col. 3, line 8: "unreleated" should be --unrelated--. Col. 3, line 49: "agents" should be --agent--. Col. 3, line 66; Col. 7, line 51; Col. 7, line 66; Col. 8, line 69; Col. 9, line 2: "interoccular" should be --intraocular--. Col. 4, line 34: "200 µg/µl" should be --200 µg/ml--. Col. 5, line 47: "antagonists" should be --antagonist's--. Col. 5, line 69: "prostagladins" should be --prostaglandins--. Col. 5, line 69: "(8.7 x $10^5$" should be --(8.7 x $10^{-5}$)--. Col. 6, line 62: "by eight $PGF_{2\alpha}$" should be --by $PGF_{2\alpha}$. Col. 7, line 5: "by" should be --any--. Col. 8, line 27: "minutes remained" should be --minutes, remained--.
Col. 8, line 60: "EXAMPLE IV" should be --EXAMPLE VI--.
Col. 9, line 9: "36" should be --36.0--. Col. 9, line 14: "Abino" should be --Albino--. Col. 10, line 17: "inflamation" should be --inflammation--. Col. 10, lines 34 and 35: "Dexamethazone" should be --Dexamethasone--.

Table 1, Col. 5 and 6:
    Column headed $PGE_2$: "[11±5.01]" should be --[11±5.0]--.
    First column, under $PPP^2$: "6.6 x 10 M" should be --6.6 x $10^{-7}$ M--. "2.7 x 10 M" should be --2.7 x $10^{-6}$ M--.
    First column, under Phloridzin: "3.4 x 10 M" should be --3.4 x $10^{-4}$ M--.
    Footnote 3: "µg" should be --ng--.

Column 2, line 71, "phosphate", second occurrence, should read -- phosphate. --.

Signed and sealed this 26th day of March 1974.

(SEAL)
Attest:

EDWARD M. FLETCHER,JR.             C. MARSHALL DANN
Attesting Officer                   Commissioner of Patents